Patented Nov. 24, 1936

2,062,039

UNITED STATES PATENT OFFICE 2,062,039

BAKING POWDER

Harry B. Rathbun, Waterbury, Conn.

No Drawing. Application July 1, 1935,
Serial No. 29,368

4 Claims. (Cl. 99—95)

This invention relates to an improved composition of matter especially adapted for use as a baking powder, and more particularly to a composition containing phthalic anhydride and alkaline carbonate as its chief active ingredients.

One object of this invention is to provide a baking powder of the above nature which will not be affected by moisture, and in which the ingredients will not react with each other appreciably unless heated to a baking temperature.

A further object is to provide a baking powder of the above nature which will be inexpensive to manufacture and efficient in use, and in which no sour taste will be produced in case an excessive amount of phthalic anhydride is accidentally used.

In previous baking powders cream of tartar or acid phosphates have generally been employed to furnish the acid constituent for reacting with the alkaline carbonate to produce the bubbles of carbon dioxide necessary for baking purposes. These materials are quite expensive and are apt to deteriorate in storage owing to the fact that they are relatively soluble in water, and would often react to form carbon dioxide even at room temperatures before going into the oven.

By means of the present invention, a baking powder composition has been produced which avoids the above and other disadvantages.

The acid ingredient of the new baking powder consists of phthalic anhydride $C_6H_4(CO)_2O$, which when dissolved in water reacts therewith to form orthophthalic acid or naphthalic acid having the formula $C_6H_4(COOH)_2$.

This organic acid is only slightly soluble in cold water and is quite weak in hydrogen ion concentration, and hence, it has practically no effect upon the sodium bicarbonate at ordinary temperatures. This property permits the baking powder containing phthalic anhydride to be stored for a long period before being used in either dry or wet atmospheric conditions.

For the purpose of providing an inert edible filler for the baking powder, the composition also includes a mixture of equal parts of flour and starch.

Phthalic anhydride reacts with bicarbonate of soda when heated in the presence of water to produce carbon dioxide, which is essential for the raising of bread, cake, pastry, etc. The reaction which takes place can be expressed symbolically in terms of the following equations:

$$C_6H_4(CO)_2O + H_2O = C_6H_4(COOH)_2$$

$$C_6H_4(COOH)_2 + 2NaHCO_3 = C_6H_4(COONa)_2 + 2H_2O + 2CO_2.$$

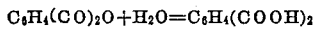
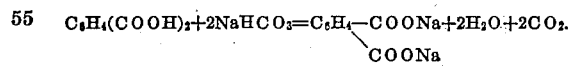

The theoretical ratio of the quantities of bicarbonate of soda and phthalic anhydride computed from the respective molecular weights of these materials is 1 part of soda to .94 part phthalic anhydride.

The invention will now be further illustrated by the following typical example:

For each pound of bicarbonate of soda, .94 pound of phthalic anhydride will be used as the active ingredients. As an inert filler 1.03 parts of starch and 1.03 parts of flour will then be added to the dry materials, and the mass thoroughly commingled by any suitable mixing machinery or apparatus. The percentages will then be as follows:

|  | Pounds | Percent |
|---|---|---|
| Bicarbonate of soda | 1 | 25 |
| Phthalic anhydride | .94 | 23.50 |
| Starch | 1.03 | 25.75 |
| Flour | 1.03 | 25.75 |
|  | 4.00 | 100.00 |

It will be understood that the above example is given by way of illustration only, and that the percentages of ingredients may be varied somewhat within the spirit of the invention.

It will be noted that phthalic anhydride has over twice the acid content per unit of weight than cream of tartar ($KHC_4H_4O_6$) commonly used in such preparations. The present market price of phthalic anhydride is about ten percent less than that of cream of tartar, and hence, it will be seen that phthalic anhydride is far more economical to use.

A further advantage of the baking powder made according to this invention is that it is entirely non-poisonous and cannot cause injury to even the most delicate digestive organs.

The phthalic anhydride baking powder produces a remarkably fine quality of bread or pastry without any of the acid taste which is sometimes met with when an excess of cream of tartar or acid phosphate is employed.

While the acid component of the baking powder has been herein disclosed as phthalic anhydride or phthalic acid, it will be understood that it is within the spirit of this invention to substitute an acid alkali phthalate, such as

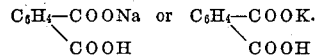

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. A dry composition for baking powder containing an alkaline carbonate and phthalic anhydride.

2. A baking powder comprising a carbonate of an alkali forming metal and an acid component containing phthalic anhydride.

3. A dry composition for baking powder containing an alkaline carbonate, phthalic anhydride, and a filler.

4. A baking powder containing the following ingredients in approximately the proportions named by weight: sodium bicarbonate 25%, phthalic anhydride 23.5%, and an inert food product as a filler 51.5%.

HARRY B. RATHBUN.